Feb. 13, 1934.   J. W. BRYCE   1,946,896
TIME RECORDER
Filed Feb. 16, 1928   5 Sheets-Sheet 1
FIG.I.
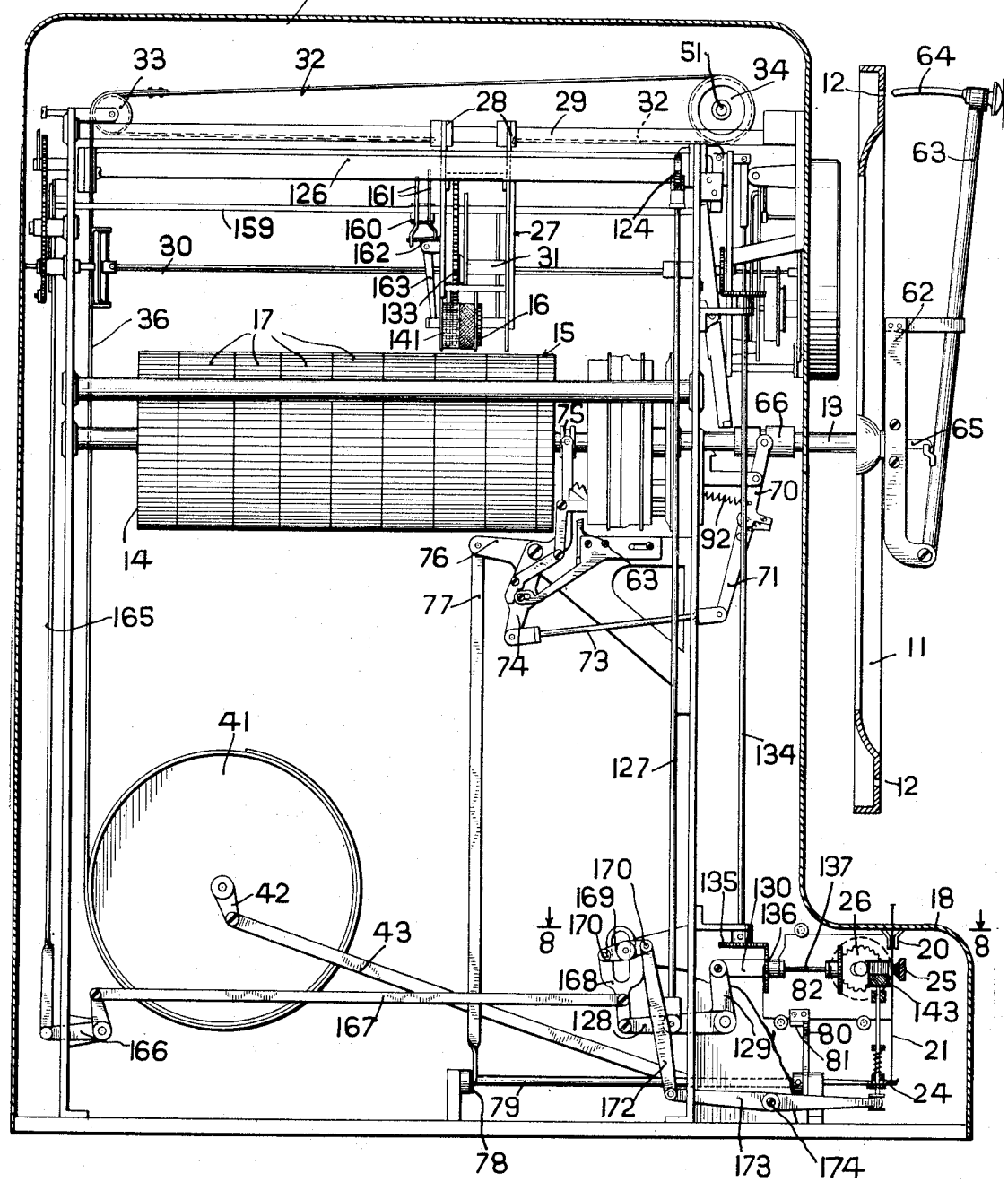
Inventor
James W. Bryce
By his Attorney
W M Wilson

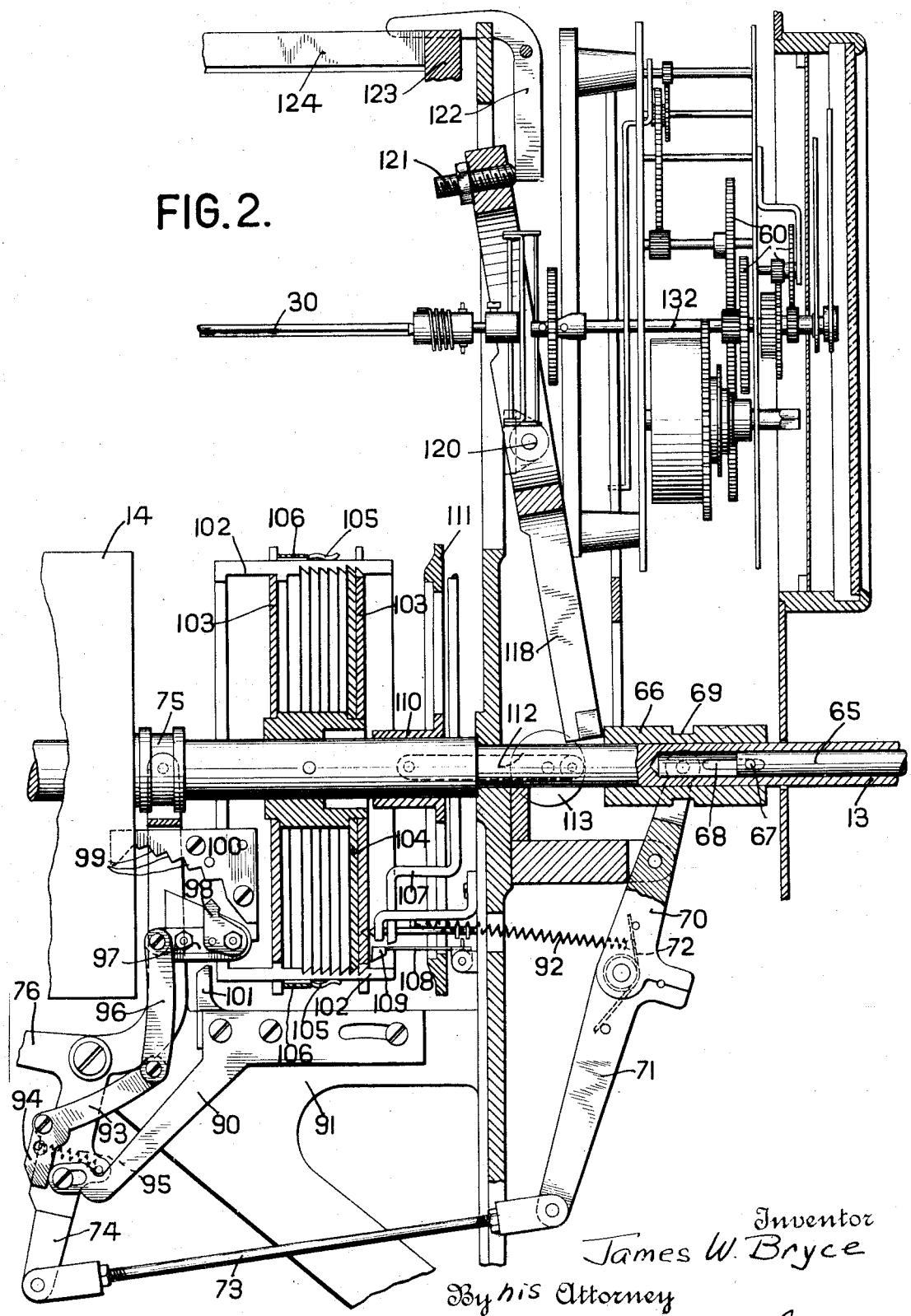

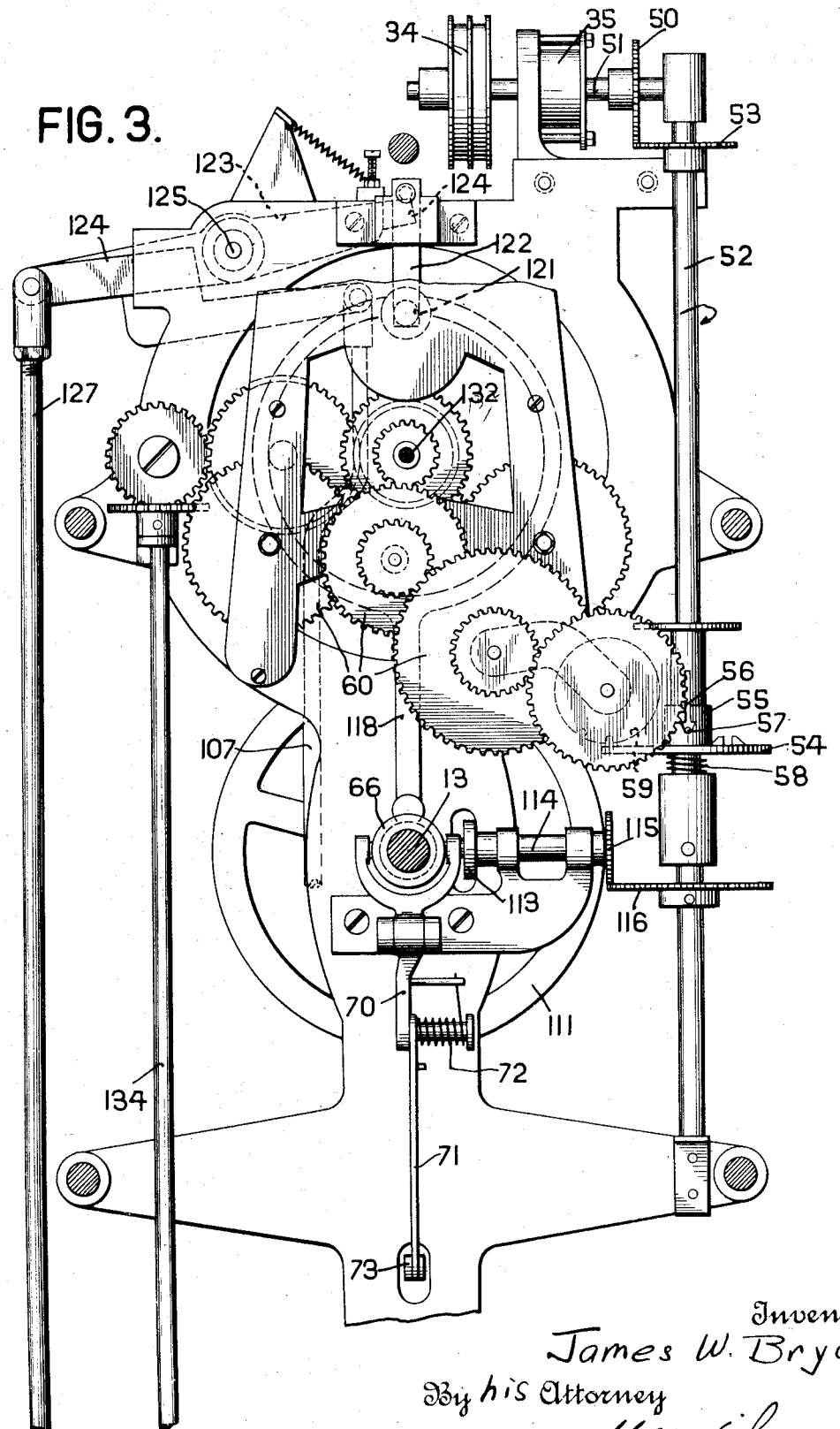

Feb. 13, 1934.    J. W. BRYCE    1,946,896
TIME RECORDER
Filed Feb. 16, 1928    5 Sheets-Sheet 4
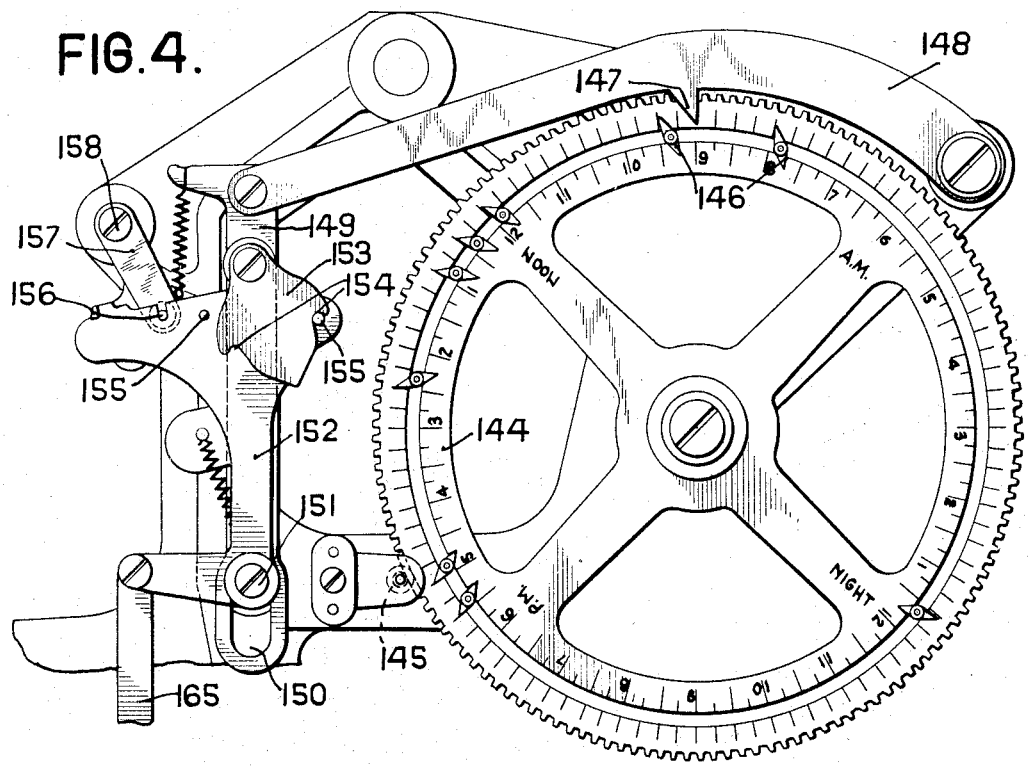

Feb. 13, 1934.   J. W. BRYCE   1,946,896
TIME RECORDER
Filed Feb. 16, 1928   5 Sheets-Sheet 5
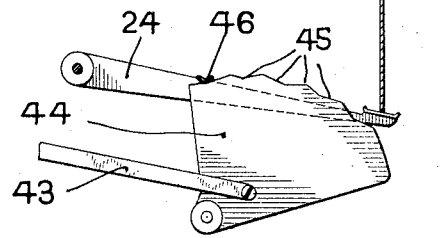
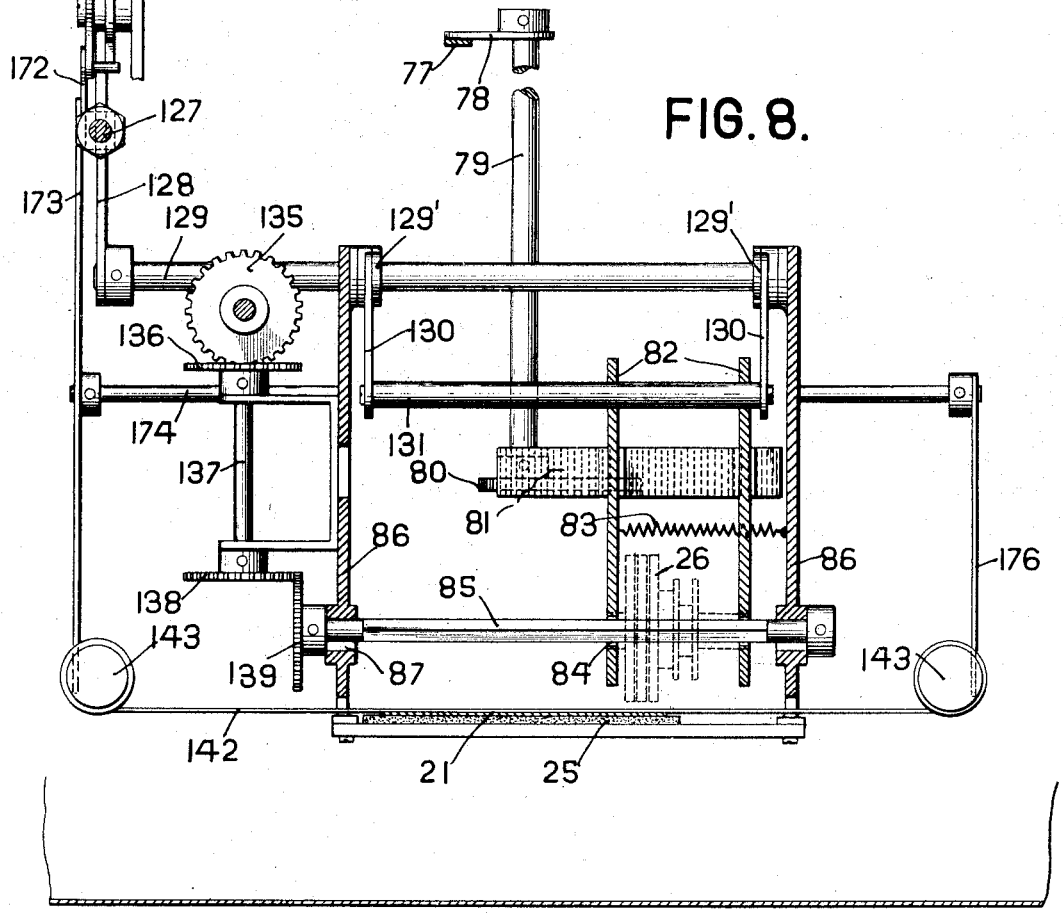

UNITED STATES PATENT OFFICE

1,946,896

TIME RECORDER

James W. Bryce, Bloomfield, N. J., assignor, by mesne assignments, to International Business Machines Corporation, New York, N. Y., a corporation of New York Application February 16, 1928. Serial No. 254,795

7 Claims. (Cl. 234—43)

This invention relates to time recorders for printing the time records of the arrival and departure of employees.

Such time recorders include so-called dial recorders wherein the records of a number of employees are printed on one record sheet. Objection has been made to dial recorders because of the fact that no record is furnished the employee of his registrations, the record sheet being solely for the use of the accounting or similar department in charge of time and pay-roll records. The employee occasionally is of the opinion that a mistake has been made in computing his time and pay. Upon his complaint, it is necessary that the accounting or similar department check his time records. This obviously occasions expenditure of time which is in most cases proved unnecessary upon the checking of the records. It is almost a rule that no mistake has occurred and the uncertainty in the employee's mind arises because he has no means of checking his registrations on the record sheet.

Another type of time recorder in general use is a card recorder wherein the time records are printed on individual record cards each assigned to a different employee and which may be freely inserted in the recorder and removed therefrom by the employee. In such recorders, "in and out" mechanism is provided, automatically controlled, for spacing the registrations in the arrival and departure columns of the record cards, a succession of such columns denoting, for example, "morning in", "noon out", "noon in", etc. In some business concerns, the employees have different working hours or may arrive and depart at different times. Thus one of the employees of a department may be scheduled to arrive at 9 A. M. and leave for lunch at 12 M while another may be scheduled to arrive at 10:30 A. M. and leave for lunch at 1:30 P. M. It is obvious from this that if the "in and out" mechanism is automatically set to locate the registrations of all the record cards, after 12 M in the "noon in" column that the second employee upon leaving for lunch will make a registration in the "noon in" column of his card. The objection to card recorders in concerns such as described is therefore that the "in and out" mechanism is inflexible and locates the registration at any given time in the same column of all the record cards. To overcome this objection, card recorders have been devised wherein the "in and out" mechanism is controlled by each individual card through punched holes in the card. These card recorders obviously require punching mechanism and punching controls, and other auxiliary and necessary mechanism having no true recording function.

The present invention has for its object the provision of a card recorder wherein the individual employees may control the "in and out" spacing on their cards without use of punching devices.

Another object of the present invention is to devise a time recorder which will obviate the objections to both the dial recorder and the card recorder.

More specifically, the invention contemplates the provision of a time recorder which will provide each employee with a check on the registrations made on the dial record.

The object of this invention is further to provide a time recorder in which the "in and out" spacing mechanism is operated under the control of each employee to print a time record on individual non-controlling record cards, each of which is assigned to a different employee.

Still further, the object of the invention is to effect a registration on a record card by operation of a manual cooperating with a dial disk.

Other objects and advantages will be further disclosed in the succeeding parts of the specification and in the accompanying drawings, wherein is shown one specific embodiment of the invention.

In the drawings:

Fig. 1 is a side sectional view through the registering device,

Fig. 2 is a detail of Fig. 1 showing particularly the "in and out" shifting control, Fig. 3 is a front view of the upper portion of the registering device, showing particularly the clock drive for the various registering mechanisms, Fig. 4 is a detail showing the program wheel for shifting the ribbon, Fig. 5 shows a record card, Fig. 6 shows part of the Monday columns of the cylinder or dial record, Fig. 7 is a detail showing the means for shifting the record card support; and, Fig. 8 is a section on line 8—8 of Fig. 1.

In detail, the recorder comprises a casing 10, on the outside of which is attached a dial 11 (Fig. 1) having a circular series of openings 12, designated by different numbers, each of which is assigned to a workman. Journalled in the center of the dial is a shaft 13 on which is fixed a cylindrical impression drum 14 carrying a record sheet 15. Printing mechanism 16 is vertically movable towards the drum to print on the record sheet. The drum record is provided with vertical divisions 17 corresponding to the usual working days of the weeks. Means are provided, hereinafter set forth, for moving the printing carriage once every twenty-four hours from one such division to the next division. Each division 17 is further divided into "in and out" sub-divisions for recording arrival and departure of the workmen (see Fig. 6). In order that the printing mechanism operate in the proper "in and out" subdivision, means are provided hereinafter described for moving the drum relative to the printing mechanism, the distance of one subdivision until all the subdivisions in one division have been covered.

Referring to Fig. 1, a portion 18 of the casing projecting forwardly below the dial 11 is provided with an opening and guides 20 for receiving and guiding a record card 21 into position in the register, (see Fig. 5) one of said record cards being assigned to each workman and designated by his number. The card is provided with the usual horizontal day columns and vertical "in and out" or arrival and departure columns. When positioned on the register, the card is supported on a pivoted member 24 (Figs. 1 and 7). On one side of the card is a platen 25 and on the other the printing mechanism 26 (see Figs. 1 and 8). Means, described hereinafter are provided to raise the pivoted card supporting member every 24 hours, sufficiently to bring the next horizontal day division on the card opposite the printing wheels. Means are also provided to move the printing means horizontally to enable printing successively in the "in and out" columns. Since the card and drum record are to be used as checks against each other, it is necessary that the recording operation on one be made simultaneously with the recording operation on the other. It is also necessary that the shifting to the proper day and time divisions of the different records be coordinated so that a simultaneous printing operation will occur in the proper divisions of the record.

The following means are provided to simultaneously shift the printing means of the cylinder record and the support of the record card to permit printing of the record in the proper day division of the records.

Referring to Fig. 1, the upper printing unit 16 is mounted on a carriage 27 provided with side frame plates 28 open at the top so as to permit limited slidable vertical movement on a guide rod 29. A time-controlled shaft 30 passes through a sleeve 31 and serves to drive the printing wheels. The carriage 27 has connected to it a band 32 extending rearwardly over an idler 33 at the rear of the machine and forwardly over a spring-driven actuating drum 34 at the front. A spring 35 tends to rotate drum 34 constantly in a clockwise direction, as viewed in Fig. 1. and thereby advance the printing carriage to the left. A second flexible band 36 is attached at one end to the upper surface of flexible band 32 and passes over idler 33 and is attached at the lower end to a wheel 41 which is constantly urged to rotate counterclockwise by a weight or spring (not shown). Said wheel is provided at its center with a crank arm 42 to which is pivoted a link 43. The other end of the link is pivotally connected to a pivoted cam sector 44 (see Fig. 7) having six cam surfaces 45 the radius of each of which is less by a predetermined amount than that of the adjacent surface to the right, as viewed in Fig. 7. The pivoted record card support previously mentioned has rigidly fixed thereto intermediate its ends a dished cam follower 46 which rests by gravity on the cam surfaces 45. Tendency of the drum 34 to rotate clockwise, as viewed in Fig. 1, causes band 36 to rotate wheel 41 clockwise thereby effecting movement of link 43 to the left and swinging cam sector 44 likewise. The cam follower 46 will then be moved on top of the next higher cam surface 45 and the card support will be raised to bring the next day division opposite the printing wheels. It is thus seen that rotation of the spring driven drum through bands 32 and 36 respectively, simultaneously effects shifting of the printing wheels relative to the cylinder record and shifting of the record card relative to the printing wheels. To regulate the amount of shifting and the time at which it occurs, a pinion 50 (see Fig. 3) is mounted on the shaft 51 of drum 34. At right angles to said shaft is a vertical shaft 52 at the upper end of which is fixed a pinion 53 meshing with pinion 50 and at the lower end of which is carried a stop disk 54 rigid with a sleeve 55 encircling the shaft and having a vertical slot 56 engaging a pin 57 on the shaft to cause rotation of the sleeve with the shaft while permitting the sleeve to be moved longitudinally of the shaft. The sleeve is normally urged upward by a spring 58. Coacting with the stop disk is an escapement device 59, driven by the clock gearing 60. The action of the escapement device and disk 54 is such as to permit rotation of shafts 51 and 52 under the influence of spring 35 once every twenty-four hours and the size and arrangement of parts is such as to limit the motion of drum 34 to an extent sufficient to shift the printing means 16 to the next day division and to shift cam 44 one cam surface to the left to raise the next day division of the card to printing position. For a more detailed showing and description of the escapement means described above, reference may be had to a patent to Kiely, No. 1,087,665, issued February 17, 1914. It is to be understood that any other convenient time-regulated control means for drum 34 may be employed. The drum is turned back to its initial position at the end of each week, the disk 54 being moved out of cooperation with the escapement device while this is being done.

The following means are provided to cause the record to be printed in the proper "in and out" columns of the cylinder and card records.

A bracket 62 is fixed to the shaft 13 which carries the impression drum 14. Pivoted to the bracket for limited movement is a manual 63 having a pin 64 adapted to enter the numbered openings 12 on the dial. By turning the manual 63 until its pin 64 is aligned with an opening in the dial, the shaft 13 and impression drum are rotated till the horizontal division on the drum record corresponding to said opening is in position for cooperating with the printing means 16. The drum record has at least as many of these horizontal divisions as there are numbered openings on the dial so that each workman has allotted to him a definite horizontal division on the record corresponding to his number. When making a registration, the workman inserts his card in the opening provided therefor in portion 18 of the casing, positioning the card for a registering operation. He then turns the manual until pin 64 is in position for entering his assigned opening in the dial 11 and presses the manual towards the dial so that the pin enters said opening. This operation of the manual always effects two distinct operations on both types of record. It simultaneously shifts the impression drum 14 and the lower printing means 26 horizontally to allow printing to occur in the proper "in and out" spaces and immediately after, simultaneously actuates both the upper and lower printing means towards the respective upper and lower records to effect the registration. In addition, depending on conditions to be later pointed out, operation of the manual may effect lateral shifting of the ribbons. The "in and out" shifting is effected as follows:

The forward end of the shaft 13 on which the impression drum is mounted is tubular at its forward end, as shown in Fig. 2, and in this tubular portion is a reciprocatory plunger 65, the front end of which is loosely engaged by the manual. At the rear of the tubular portion, just inside the casing 10, the shaft 13 carries an axially movable collar 66 connected to the plunger 65 by a pin 67 extending through slots 68 in the sides of the shaft. When the plunger is moved inwardly by the manual, the collar 66 will be moved towards the rear. The collar is formed with a circumferential groove 69 engaged by the forked end of a downwardly extending lever consisting of two separable portions 70 and 71 yieldably held in alignment by a spring 72. A link 73 connects the lever portion 71 with another lever 74 having a forked connection at its upper end with a sleeve 75 fixed to the impression drum shaft 13. When the manual is operated plunger 65 moves sleeve 66 inwardly and through lever 70—71 and link 73 rocks lever 74 counterclockwise moving the shaft 13 and the impression drum to the left. As seen in Fig. 1, the lever 74 has an arm 76 to which is pivoted a downwardly extending link 77 having a pivotal connection at its lower end with a crank arm 78 (see Fig. 8) pinned to one end of a shaft 79. The latter carries at its other end a segmental rack 80, which meshes with straight rack 81 to which is attached a pair of parallel, vertical plates 82, (Figs. 1 and 8) normally urged to the right by a spring 83. These plates have openings 84 which guide the plates for movement along a polygonal shaft 85 journalled in frame plates 86 by means of elongated slots 87 which permit a lateral movement of the shaft. Confined between plates 82 is the printing mechanism 26. It will thus be seen that when the manual is pressed inwardly in making a registration, the plunger 65 will be moved inwardly and through sleeve 66 lever 70—71 and link 73 rock lever 74 counterclockwise to move the impression drum 14 and shaft 13 to the left relative to printing means 16 and through arm 76, link 77, shaft 79, racks 80 and 81, move the plates 82 and the printing wheels 26 to the left relative to the record card 21. These aforesaid operations enable printing in the proper "in and out" divisions of the records.

To limit the above described movement of both the impression drum and the lower printing mechanism 26 to the desired amount and to prevent their retraction to permit registration in a previous column by a tardy workman, the lever 74 has slotted connection with a member 90 (Fig. 2) mounted on the fixed frame 91 for longitudinal movement. A spring 92 normally holds the lever 70—71, link 73, lever 74, and member 90 in the position shown in Fig. 2. A lever 93 pivoted to lever 74 has a depending arm 94 held in abutting relation by a spring 95 with the lower end of member 90. The other arm of lever 93 is pivoted to a link 96 which is pivotally connected to one end of a lever 97 the other end of which carries a pawl finger 98 for engagement with the teeth 99 of an arc-shaped stop member 100 rigidly attached to a fixed portion of the register frame. The teeth 99 are formed on the arc of a circle whose center is the pivot of lever 74 so that when the latter is rocked to actuate the impression drum, the pawl finger will move past the teeth 99 unless the lever 97 carrying the pawl is rocked counterclockwise to raise the pawl into engagement with one of the teeth. This is accomplished as follows: Member 90 is provided with an upstanding lug 101 which as the lever 74 is rocked counterclockwise engages the lowermost one of a circular series of ratchet pins 102 slidably mounted in notches in the periphery of a pair of spaced circular disks 103. There is a ratchet pin corresponding to each workman's dial notch 12 and horizontal space on the drum record. A circular pawl disk 104 engages one of the teeth on each of said ratchet pins to prevent their movement relative to the disks. The pins are all held yieldingly against the edge of the pawl disk by spring tongues 105 on a spring band 106 encircling the pins, so that the forward portion of each pin can be swung radially outward from engagement with the pawl disk to permit forward movement of the pin. These pins are advanced at each registration by a rod 107 which is moved downwardly during the printing operation, to be described hereinafter, to engage and depress a pivoted spring blade 108 having a pawl nose 109 at its free end. The pawl nose is thereby forced into contact with the lowermost ratchet pin and moves said lowermost pin only away from the pawl disk. At this time, the lug 101 on member 90 engages the pin and carries the tooth previously engaged with the pawl disk past the latter, but the pin is prevented from moving more than one tooth space by engagement of the pawl nose 109 with the next ratchet tooth on the pin. The number 90 is thus brought to a stop and upon further movement of lever 74, the arm of lever 93 is forced backwardly relative to the lever by engagement with the end of the arrested member 90. Lever 93 is thereby rocked clockwise, moving link 96 downwardly and rocking pawl finger 98 upwardly to engage the adjacent notch 99 in the arcuate member 100. The lever 74 is thus prevented from rocking further and the impression drum is stopped, the arms of lever 70—71 yielding relatively to permit continued movement of the sleeve 66. Upon release of the manual 63 by the operator, spring 92 acting on arm 70 of lever 70—71 forces lever arm 71 inwardly, thus effecting clockwise oscillation of lever 74 which through collar 75 moves drum shaft 13 to the right (see Fig. 2) and through link 77 moves printing means 26 to the extreme right (as shown in Fig. 8). Thus after each registration, the drum and printing means 26 take a normal or rest position. After this registration, if the workman desires to register again, the impression drum will be advanced one "in and out" division further from its normal position, since the ratchet pin corresponding to the workman's number has been moved forward one toothspace and the pawl 98 will thus engage the next notch 99 to the left of the one previously engaged. The registration will thus occur in the next in-and-out division and a registration cannot be repeated in any of such divisions. Likewise, the lower printing wheels 26 will be carried opposite the next "in and out" division of the card should an attempt be made to repeat a registration. At the end of the day, the pins are returned to heir inilial position by a sleeve 110 (Fig. 2) mounted loosely on shaft 13. The sleeve is provided with ends of the pins 102 and carry them back past the pawl disk 104, the inclined portion of the rim camming the pins out of contact with the pawl disk during this movement. The sleeve 110 has pivoted thereto a link 112 (Fig. 2) connected at the other end to a crank disk 113 on one end of a short transverse shaft 114. On the other end of this shaft is a gear 115, meshing with a larger gear 116 on the vertical shaft 52 which makes one third of a revolution each day. The ratio of the gears is such that gear 115 will make one revolution each day and disk 111 will therefore be slid back against the ratchet pins and carry the latter to their initial position once each day.

In addition to the "in and out" shifting movement just described, the operation of the manual by a workman is adapted to effect simultaneous actuation of both the upper and lower printing mechanisms towards their respective records to effect the registration. Referring to Fig. 2, it will be remembered that operation of the manual results in moving sleeve 66 keyed to the shaft 13 towards the left. Abutting the left end of said sleeve is an upwardly extending lever 118 pivoted to the frame at 120. The lever is rocked clockwise by inward movement of the sleeve so that a screw 121 at the upper end of the lever rocks a right-angled lever 122 counterclockwise, the horizontal portion of said lever being thereby impelled downwards carrying with it one of the arms 123 of a horizontally disposed frame 124 pivoted at 125 (see Fig. 3) and having its inner bar 126 overlying the vertically movable carriage 27 of the printing device 16. The depression of arm 123 results in moving frame bar 126 towards the printing device to depress the latter in whatever position it may be, and cause it to print on the cylinder record. Simultaneously with the printing on the cylinder record, the printing on the record card is accomplished by a linkage connected to the frame 124 on the opposite side of the pivot 125 to bar 126 (see Fig. 3). Thus upon rocking of bar 126 downwardly, the opposite end of the frame will move upwardly, carrying with it a link 127 (see Figs. 1, 3 and 8). Connected to the lower end of link 127 is an arm 128 connected for actuation to a shaft 129 (Figs. 1 and 3) on which are carried other arms 129' pivotally connected to links 130 (Figs. 1 and 8) connected by a rod 131 which is seated in slots in the plates 82. It will be remembered that these plates are mounted on shaft 85 carrying the printing device 26. Thus when link 127 is raised, it rocks arm 129 to the right (as seen in Fig. 1) and through links 130, rod 131 and plates 82 move the shaft 85 with the printing devices 26 towards the record card, this movement being permitted by the elongated journal slots 87 in the frame 86. In this manner, a printing operation is effected on the record card simultaneously with the printing operation on the cylinder record.

The printing devices 16 and 26 are time-controlled so as to present the proper type opposite the records. Referring to Fig. 2, the clock gearing shaft 132 has a universal connection with the aforementioned transverse shaft 30 for rotating printing device 16. In Fig. 1, it will be seen that the printing device is provided with gearing 133 rotated by said shaft so that rotation of the latter effects rotation of the printing type in accordance with the operation of the clock. The precise construction of the type wheels and gears is not material to the present invention and will not be further described herein. The clock gearing, as will be seen in Figs. 1 and 3, is also connected to a shaft 134, rotating the latter in accordance with the time. The lower end of the shaft 134 is provided with a gear 135 meshing with gear 136 to drive a short shaft 137 (Fig. 8) which has a gear 138 meshing with a gear 139 on the end of shaft 85 for driving the latter and the printing device 26 mounted thereon. Gear 139 is provided with long teeth to prevent its being demeshed from gear 138 during the movement of shaft 85 towards the record card in the printing operation. It is thus seen that the clock gearing simultaneously regulates the movement of the type wheels of printing devices 16 and 26.

Positioned between each set of type wheels and the records are the inking ribbons. The upper inking ribbon is guided and wound in spools 141 (only one of which is shown in Fig. 1). The lower inking ribbon 142 is guided and wound on spools 143 (see Fig. 8). Each ribbon is provided with two differently colored sections, which are selectively positioned for cooperation with the printing type, under control of a program wheel 144 (see Fig. 4) driven by the clock gearing through gear 145. The program wheel is provided with the usual adjustably positioned cam lugs 146 which cooperate with a projection 147 on a lever 148 pivoted to the register frame at one end and connected to a vertically movable link 149 at its other end. The link 149 is provided with a slot 150 movable on a pin 151 on which is pivoted a member 152. Link 149 has pivoted thereto at its upper portion an acorn member 153 having two notches 154 for engaging pins 155 on the member 162. As shown in Fig. 4, the acorn member is engaging the right hand pin 155. When the next lug 146 engages projection 147, it moves lever 148 upwardly, releasing the acorn member from said right hand pin. The pivot of the acorn member is closer to the left hand pin than the right hand pin. As a result, when the acorn member is released from the position shown in Fig. 4, it swings to a vertical position and upon descent of the lever and the link connected thereto, the acorn notch engages the left hand pin and cams against the pin to move the member 152 to the left the latter taking an angular position the reverse of that shown in Fig. 4. The movement of member 152 to the left (as viewed in Fig. 4) effects lateral color shifting of the ribbon spools of both the cylinder record printing means and the record card printing means.

Member 152 effects shifting of the ribbon spools of the upper printing mechanism 16 as follows: Said member is provided with a pin and slot connection 156 to a link 157 pivoted to the fixed frame at 158 and having a rod 159 extending at right angles rigidly from the side of the link and transversely of the machine, as shown in Fig. 1. The precise details of the ribbon shifting mechanism are well known in the art and hence a brief description will suffice to show the coaction between the ribbon shifting means and the program-operated member 152. Rod 159 is pivotally connected to a frame 160 (Fig. 1) which is relatively fixed to a pair of members 161 pivotally mounted on a rod 162. The rod is fixed to a U-shaped lever 163 pivoted to the left hand side of the printing carriage, the pivotal connection lying between the points of connection of member 161 to rod 162. The downwardly extending legs of lever 163 have connections to the ribbon spools 141. Thus upon shifting by the program wheel of the member 152 to the left (as viewed in Fig. 4), the rod 159 on link 158 moves to the left and positions the upper end of right hand member 161 (as viewed in Fig. 1) beneath the bar of the printing actuating bar 126. Hence, when the bar is depressed to actuate the printing carriage towards the record, it engages said right hand member and through rod 162 swings lever 163 to the left, thus shifting the ribbon spools 141 to the left to position the right hand half of the ribbon for cooperating with the printing means. Immediately thereafter printing is effected. The ribbon stays in shifted position until the next program cam lug effects shifting in the opposite direction to that just described. To shift the lower ribbon spools, a link 165 is pivoted to member 152 (see Fig. 4). Upon movement of the latter counterclockwise as previously described, link 165 is depressed and through a bell-crank 166 and link 167 shifts a member 168 to the left. In Fig. 1, the position of the member 168 is that immediately after shifting to the left has occurred. A lever 169 is pivoted intermediate its ends to the frame and is provided with a pin 170 on the left hand end which is seated against a left shoulder on member 168. Lever 169 has a similar pin 170' on the right hand end which is adapted to coact with a shoulder on the right side of member 168. Pin 170' also serves to pivotally connect lever 169 to a link 172 which is adapted to oscillate link 173 fixed to a shaft 174 (Figs. 1 and 8). The outer end of link 173 is splined to one of the ribbon spool shafts 175 (as seen in Figs. 1 and 8) while shaft 174 has fixed thereto a second link 176 parallel to link 173 which is splined to the other ribbon spool shaft (as indicated in Fig. 8). It will be remembered that to effect the printing operation, a rod 127 is raised.

This rod, as already explained, is connected to a lever 128 to which is pivoted the member 168. Hence when rod 127 is raised with the parts in position as in Fig. 1, the member 168 will be lifted and due to the engagement of the shoulder on the latter with pin 170, will rock lever 169 clockwise and through links 172, 173, and 176 will raise the ribbon spool shafts and the bottom half of the ribbon will thereby be positioned in cooperation with the printing means 26. The ribbon spools will be retained in their raised position by friction. Lever 169 is now tilted in the opposite direction to that shown in Fig. 1. Member 168, however, will be lowered to the position shown in Fig. 1 by the action of rod 127. Upon the next program change, link 165 will be raised and shift member 168 to the right, so that when the rod 127 is raised during registering operation, pin 170' on lever 169 will coact with the right hand shoulder of member 168 and lifting of the latter will tilt lever 169 back again to the position shown in Fig. 1 effecting lowering of the ribbon spools which are held in shifted position by friction.

The operation of the combined dial and card recorder will be briefly summarized. The operator inserts his individual record card into guides 20 of the register and then rotates manual 63 until its pin 64 is opposite the aperture 12 having the number assigned to said operator. This rotary movement of manual 63 results in positioning the proper horizontal space on the cylinder record 15 below the printing means 16. The operator then pushes the manual inwardly so that the pin 64 enters the aperture 12. This operation results through the action of sleeve 66, etc. in shifting the drum 14 laterally to the proper "in and out" column on the cylinder record and in shifting the printing means 26 to the corresponding "in and out" column of the record card 21. This lateral shifting movement is controlled by pins 102 which act to stop a member 90 and raise a pawl dog 98 into engagement with a tooth 99 in an arc-shaped member 100. The ratchet member is advanced one tooth-space during this lateral shifting movement by action of a rod 107 actuated by link 180 (see Fig. 3) rigidly movable with the printing actuating frame 124. Thus no further registration can be made in the same "in and out" column of either the record card or drum record by the same operator as an attempt to do so will shaft the drum and printing wheels 26 to the next "in and out" column when it will be stopped by contact of said ratchet member 102 with the lug 101 of member 90. As the manual is pushed inwardly to permit pin 64 to enter aperture 12 in the manner described, it not only causes motion of sleeve 66 to shift the drum and lower printing means 26 laterally, but through a lever 118 depresses a frame bar 126 to actuate the printing carriage 27 vertically downwards, effecting a registration upon the cylinder record. Simultaneously with operation of printing carriage 27, frame 124 raises a rod 127 (see Figs. 1 and 3) and through links 128, 129 and 130 (see Fig. 8) effects movement of printing means 26 towards the record card to print in the latter.

In Figs. 5 and 6 is shown a card record for operator No. 4 and the corresponding cylinder record. It is seen that the same registrations for the Monday "in and out" columns is made on each type of record, thus providing duplicate records. The operator uses the card record as a check against the cylinder record which is for the sole use of the bookkeeping or similar department.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. A time recorder comprising a time controlled printing device, mechanism for loosely insertably receiving and removably supporting without bending flat record cards each individual to a single workman, each card having a plurality of successively disposed "in and out" columns in position to receive an imprint from said printing device, means for effecting relative movement of said printing device and a record card to print a registration on said card, means extraneous of the record card supporting mechanism and operated by said first-named means for locating said registration in the proper "in and out" column of the record card, said means preventing registration in the same "in and out" column of the record card upon a succeeding operation of said first-named means.

2. A time recorder for printing time records on cards, each of which is assigned to a different operator comprising a time controlled printing device, means for positioning a flat card opposite said printing device, said positioning means including a carriage permanently mounted in the recorder and permitting free insertion and removal of said record card without bending the latter, a dial provided with a plurality of differently designated apertures, one of which correment adapted to enter any of said apertures, said manual being movable to position said element opposite the aperture having a designation corresponding to a designation on the inserted record card, said manual being thereafter movable inwardly towards said dial to cause said element to enter the aperture opposite thereto, and means controlled by said manual upon its inward movement for first relatively positioning said printing device and card to position the printing device opposite the proper "in and out" division of said card, and means controlled by said manual for thereafter effecting relative movement of said printing device and said card to effect the registration.

3. In a time recorder, in combination, a single holder permanently mounted in the machine for loosely insertably receiving flat record cards, each individual to a workman, a device for printing on said cord, a series of stops, each corresponding to a different record card and workman, mechanism cooperating with one of said stops at a time for selecting the portion of a card to receive an imprint, and a manual member operative to successively select the corresponding one of said stops for operation, actuate said mechanism into cooperation with the selected stop, and effect printing by said device in the selected portion of the record card.

4. A time recorder comprising in combination, a holder for loosely insertably receiving record cards, individual to each workman, a printing device for printing on each card, a plurality of stops, each corresponding to a different record card and workman and each settable to one of a plurality of positions, mechanism cooperating with one of said stops at a time for relatively moving the printing device and card to select a card space for printing, a manual member for successively selecting one of said stops for operation, actuating said mechanism into cooperation with the selected stop, and causing printing by said device in the selected space; and means for setting the selected stop to a new position upon a printing operation to change its position preparatory to a subsequent printing operation on a different space on the same card.

5. A time recorder comprising printing mechanism, means for loosely and removably supporting a flat record card individual to a single workman in printing position, manually operated means for effecting relative movement of said printing mechanism and said card to print in the latter, settable "in-and-out" spacing mechanism for controlling said relative movement, and means operated by the manually operable means for automatically changing the set-up of the "in-and-out" spacing mechanism during each operation of the manually operated means whereby to prevent over-printing a previous imprint.

6. A time recorder including duplex registering devices for printing a record retained in the recorder and a duplicate checking record to be removed from the recorder comprising a record sheet holder mounted within the recorder and adapted to receive and hold a record sheet delineated to provide spaces for receiving successive registrations representing successive times for a plurality of workmen and including mechanism for effecting successive time records of each workman in different areas in combination with a record card holder for removably receiving an individual record card for each workman, separate time controlled printing devices for the record sheet and the record cards and means connecting the printing elements so that each represents the same time and an operating element with devices to effect both printing devices on different corresponding areas of the record sheet and the card, whereby the record sheet contains a plurality of time indications each in a different position and each located on the record sheet to indicate by its position the workman to which it refers and the several cards inserted containing registrations identical with those on the record sheet appertaining to the individual workman to whom the card is allotted.

7. A time recorder including a printing mechanism for printing upon a record sheet in the recorder and automatic shifting mechanism to effect relative movement between the printing mechanism and the sheet periodically to cause printing allotted to different predetermined time periods to be effected on different areas of the record sheet, a record card holder and printing mechanism associated therewith, shifting mechanism for effecting relative shifting between the record card holder and its printing mechanism to cause printing at different times to be effected on different areas of a card inserted into the card holder, connections between the automatic shifting mechanism and the shifting mechanism of the card holder to cause operation of the latter on each automatic operation of the former, whereby registrations at different times may be printed on corresponding areas of the record sheet and a card in the holder, an operating element for causing operation of the printing devices and connections between both printing devices and the operating element so that a single operation of the operating element effects printing on corresponding areas of both the record sheet and a card in the card holder.

JAMES W. BRYCE.